United States Patent
Gamboa et al.

(10) Patent No.: US 8,255,070 B2
(45) Date of Patent: Aug. 28, 2012

(54) METHOD AND APPARATUS FOR ESTABLISHING A CAMERA FOCAL LENGTH FOR INSTALLING FASTENERS

(75) Inventors: James D. Gamboa, Anaheim, CA (US); Raymond J. Slesinski, Arnold, MO (US); William P. Zanteson, Monrovia, CA (US); Leslie A. Hoeckelman, O'Fallon, MO (US)

(73) Assignee: The Boeing Company, Chicago, IL (US)

(*) Notice: Subject to any disclaimer, the term of this patent is extended or adjusted under 35 U.S.C. 154(b) by 335 days.

(21) Appl. No.: 12/575,036

(22) Filed: Oct. 7, 2009

(65) Prior Publication Data

US 2011/0082576 A1 Apr. 7, 2011

(51) Int. Cl.
*G06F 19/00* (2011.01)
(52) U.S. Cl. .......... 700/108; 700/180; 235/375
(58) Field of Classification Search .......... 700/108, 700/160, 180, 169; 235/375, 462.01, 462.49
See application file for complete search history.

(56) References Cited

U.S. PATENT DOCUMENTS

| | | | |
|---|---|---|---|
| 6,520,974 B2* | 2/2003 | Tanner et al. | 606/153 |
| 2002/0162889 A1* | 11/2002 | Navon | 235/462.14 |
| 2006/0069462 A1* | 3/2006 | Cannedy et al. | 700/180 |
| 2007/0073439 A1* | 3/2007 | Habibi et al. | 700/213 |
| 2008/0061145 A1* | 3/2008 | McGushion | 235/462.13 |
| 2008/0115589 A1* | 5/2008 | DeRose et al. | 73/862.23 |
| 2008/0178713 A1* | 7/2008 | Long et al. | 81/467 |
| 2008/0319570 A1* | 12/2008 | Van Schoiack | 700/110 |
| 2009/0112925 A1 | 4/2009 | Amirehteshami et al. | |
| 2010/0116887 A1* | 5/2010 | Barkan et al. | 235/440 |

* cited by examiner

*Primary Examiner* — Kidest Bahta
(74) *Attorney, Agent, or Firm* — Yee & Associates, P.C.

(57) ABSTRACT

A method and apparatus for processing a fastener system. A fastener installation tool may be placed on a surface of an object. An elongate structure may be attached to the fastener installation tool and may have a length. A camera may be associated with the fastener installation tool in which the camera may be configured with a focal length corresponding to the length of the elongate structure. The camera also may be configured to capture an image at least a portion of the fastener system when the elongate structure is placed against the surface of the object on which the fastener system is located. The image of the at least a portion of fastener system may be captured.

11 Claims, 11 Drawing Sheets

METHOD AND APPARATUS FOR ESTABLISHING A CAMERA FOCAL LENGTH FOR INSTALLING FASTENERS

BACKGROUND INFORMATION

1. Field

The present disclosure relates generally to manufacturing and, in particular, to a method and apparatus for securing components to each other using fasteners. Still more particularly, the present disclosure relates to a method and apparatus for establishing a focal length for a camera used in installing fasteners.

2. Background

In manufacturing objects, such as aircraft, components may be secured to each other to form the aircraft. For example, without limitation, skin panels may be attached to frames, spars may be attached to ribs, and other components may be attached to each other to form the aircraft. Fasteners may be used to attach parts to each other. A fastener may be a hardware device that mechanically joins or affixes two or more components together. A particular type of fastener may have various requirements for installing the fastener. For example, without limitation, a fastener may have a required amount of torque, swage force, preload, and/or other parameters.

This information may be located only on the package containing the fasteners. When the package is opened, this information may be lost or may be entered into a data processing system or paper record system. One manner in which verification of parameters for a fastener may be made is to take an image of the fastener and identify information for installing the fastener from the image. A camera may be mounted on a tool to obtain the image. This image may be sent to a computer system, which analyzes the image to identify information for use in installing the fastener.

Although this type of process for obtaining information about fasteners may be quicker than manual checking of records or tables, the process may be undesirable if the images do not have a quality sufficient for making the desired identification of fasteners.

With the current systems that use cameras to create the images of fasteners, these cameras may be in a fixed position on a fastener installation system. The parts to be fastened to each other may be moved into a preselected location on the tool. The image of the fastener on the surface of the structure may be taken and sent to a computer system. The computer system may analyze the image and return information used by the tool to install the fastener.

Accordingly, it would be advantageous to have a method and apparatus which takes into account one or more of the issues discussed above, as well as possibly other issues.

SUMMARY

In one advantageous embodiment, an apparatus may comprise a fastener installation tool, an elongate structure configured for attachment to the fastener installation tool and having a length, and a camera associated with the fastener installation tool. The camera may be configured with a focal length corresponding to the length of the elongate structure. The camera may be configured to capture an image of at least a portion of a fastener system when the elongate structure is placed against a surface of an object on which the fastener system is located.

In another advantageous embodiment, a fastener installation system for installing fastener systems in an aircraft structure may comprise a fastener installation tool, a camera associated with the fastener installation tool, a light system, an elongate structure, a computer system, a wireless communications unit, and a controller. The camera may be configured with a focal length corresponding to a length of the elongate structure. The light system may comprise at least one of a number of light emitting diodes and sunlight. The elongate structure may have a length and may be configured for attachment to the fastener installation tool. The camera may be configured to capture an image of at least a portion of a fastener system when the elongate structure, attached to the fastener installation tool, is placed against a surface of an object on which the fastener system is located. The elongate structure may be selected from one of a first socket, a second socket, and a cylinder. The first socket may be configured to engage the at least a portion of the fastener system and may be configured to be attached to the fastener installation tool adjacent to the camera. The second socket may have a first channel in which the second socket may be configured for attachment to the fastener installation tool through a tool holder. The second socket may be comprised of a metal in which a first translucent material may be associated with walls of the first channel. The camera may be associated with the tool holder and may capture the image through the first channel. The cylinder may have a second channel though which the camera may capture the image. The cylinder may be comprised of a second translucent material configured to transmit light from the light system to the fastener system. The computer system may be configured to identify fastening information for installing the fastener system from the image of the at least a portion of the fastener system. The wireless communications unit may be in communication with the camera and may be configured to send the image of the at least a portion of the fastener system to the computer system. The controller may be configured to receive the fastening information from the computer system for use in installing the fastener system and to use the fastening information to install the fastener system.

In yet another advantageous embodiment, a method may be present for processing a fastener system. A fastener installation tool may be placed on a surface of an object. An elongate structure may be attached to the fastener installation tool and may have a length. A camera may be associated with the fastener installation tool in which the camera may be configured with a focal length corresponding to the length of the elongate structure. The camera may be also configured to capture an image of at least a portion of the fastener system when the elongate structure is placed against the surface of the object on which the fastener system is located. The image of the at least a portion of the fastener system may be captured.

In still yet another advantageous embodiment, a method may be present for installing fastener systems in an aircraft structure. A fastener installation tool may be placed on a surface of an object. An elongate structure may be configured for attachment to the fastener installation tool and the elongate structure may have a length. A camera may be associated with the fastener installation tool in which the camera may be configured with a focal length corresponding to the length of the elongate structure. The camera also may be configured to capture an image of at least a portion of a fastener system when the elongate structure is placed against the surface of the object on which the fastener system is located. A light system may be associated with the fastener installation tool. The elongate structure may be selected from one of a first socket, a second socket, and a cylinder. The first socket may be configured to engage the at least a portion of the fastener system and configured to be attached to the fastener installation tool adjacent to the camera. The second socket may have a first channel in which the second socket may be configured for attachment to the fastener installation tool through a tool holder. The second socket may be comprised of a metal in which a first translucent material may be associated with walls of the first channel. The camera may be associated with the tool holder and may capture the image through the first channel. The cylinder may have a second channel though which the camera captures the image. The cylinder may be comprised of a second translucent material configured to transmit light from the light system to the fastener system. The image of the at least a portion of the fastener system may be captured. The image of the at least a portion of the fastener system may be sent to a computer system. The fastener system may be identified using the image in response to receiving the image at the computer system. Fastening information for installing the fastener system may be identified in response to identifying the fastener system. The fastening information identified for installing the fastener system may be sent from the computer system to the fastener installation tool in response to sending the image to the computer system. Operation of the fastener installation tool may be controlled using the fastening information received from the computer system to install the fastener system.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
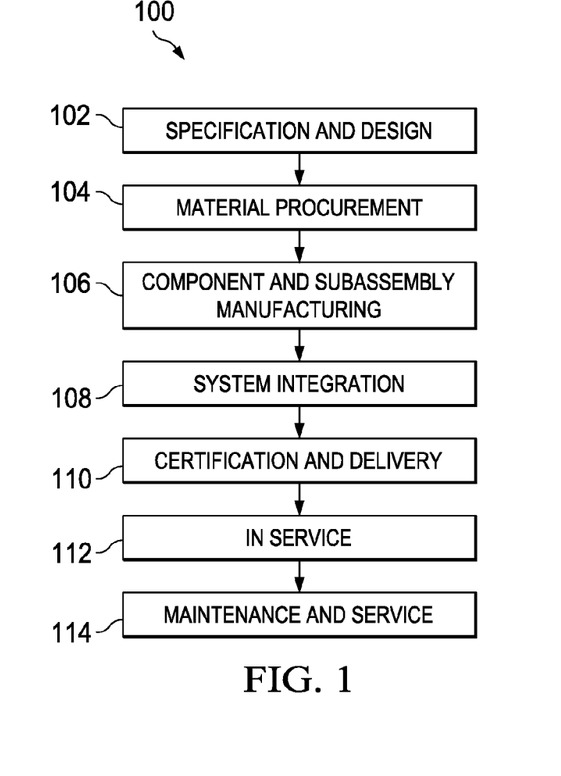
FIG. 1 is an illustration of an aircraft manufacturing and service method in accordance with an advantageous embodiment.
Figure 2:
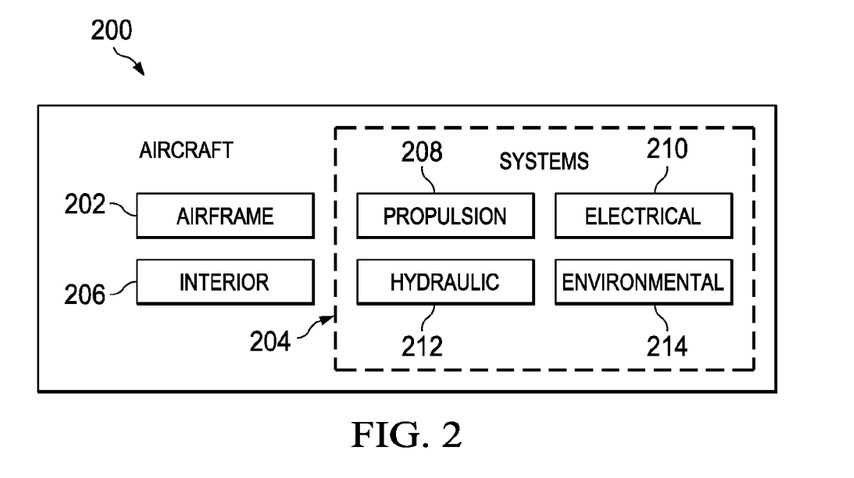
FIG. 2 is an illustration of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 may take place. Thereafter, aircraft 200 in FIG. 2 may go through certification and delivery 110 in order to be placed in service 112. While in service by a customer, aircraft 200 in FIG. 2 may be scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 may be produced by aircraft manufacturing and service method 100 in FIG. 1 and may include airframe 202 with a plurality of systems 204 and interior 206. Examples of systems 204 may include one or more of propulsion system 208, electrical system 210, hydraulic system 212, and environmental system 214. Any number of other systems may be included. Although an aerospace example is shown, different advantageous embodiments may be applied to other industries, such as the automotive industry.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, without limitation, item A or item A and item B. This example also may include item A, item B, and item C or item B and item C.

In one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, a number of apparatus embodiments, method embodiments, or a combination thereof may be utilized during production stages, such as component and subassembly manufacturing 106 and system integration 108 in FIG. 1 to install fastener systems. A number, when referring to items, means one or more items. For example, a number of apparatus embodiments may be one or more apparatus embodiments.

A number of apparatus embodiments, method embodiments, or a combination thereof may be utilized while aircraft 200 is in service 112 and/or during maintenance and service 114 in FIG. 1. The use of a number of the different advantageous embodiments may substantially expedite the assembly of and/or reduce the cost of aircraft 200 in the installation of fastener systems in aircraft 200.

The different advantageous embodiments may recognize and take into account a number of different considerations. For example, without limitation, the different advantageous embodiments may recognize and take into account that currently used camera systems for creating images used to identify information for installing fasteners may be fixed on a machine in which a fixed distance always may be present between the camera and the fastener on the part. In other words, the distance between the camera and the fastener may not change. As a result, a fixed focal length may be present. The focal length of a camera in these illustrative embodiments may be a distance between the lens of the camera and a point at which light converges.

The different advantageous embodiments may recognize and take into account that with a tool that is handheld or a moveable human operator, the distance between the camera on the tool and the fastener system for which the image is to be taken may change. As a result, the distance between the camera and the fastener system may not be substantially the same as the focal length. Consequently, the image may not have a desired quality needed to obtain information for installation of the fastener system.

The different advantageous embodiments recognize and take into account that currently available camera systems for use in generating images to identify fasteners may not be configured to easily and/or automatically change the focal length when the distance between the tool and the fastener changes. If the image is unclear and/or if the user moves or shakes the tool during capturing of the image of the fastener, a correct identification of the fastener may not occur. As a result, information needed to correctly install fasteners may not be found.

Thus, the different advantageous embodiments provide a method and apparatus for establishing a camera focal length for use in identifying information to install fastener systems. In one advantageous embodiment, an apparatus may comprise a fastener installation tool, an elongate structure, and a camera. The elongate structure may be configured for attachment to the fastener installation tool in which the elongate structure may have a length. The camera may be associated with the fastener installation tool. The camera may be configured with a focal length corresponding to the length of the elongate structure. The camera may be configured to capture an image of at least a portion of the when the elongate structure is placed against a surface of an object on which the fastener system is located.

A first component may be considered to be associated with a second component by being secured to the second component, bonded to the second component, fastened to the second component, and/or connected to the second component in some other suitable manner. The first component also may be connected to the second component by using a third component. The first component also may be considered to be associated with the second component by being formed as part of and/or as an extension of the second component.

Figure 3:
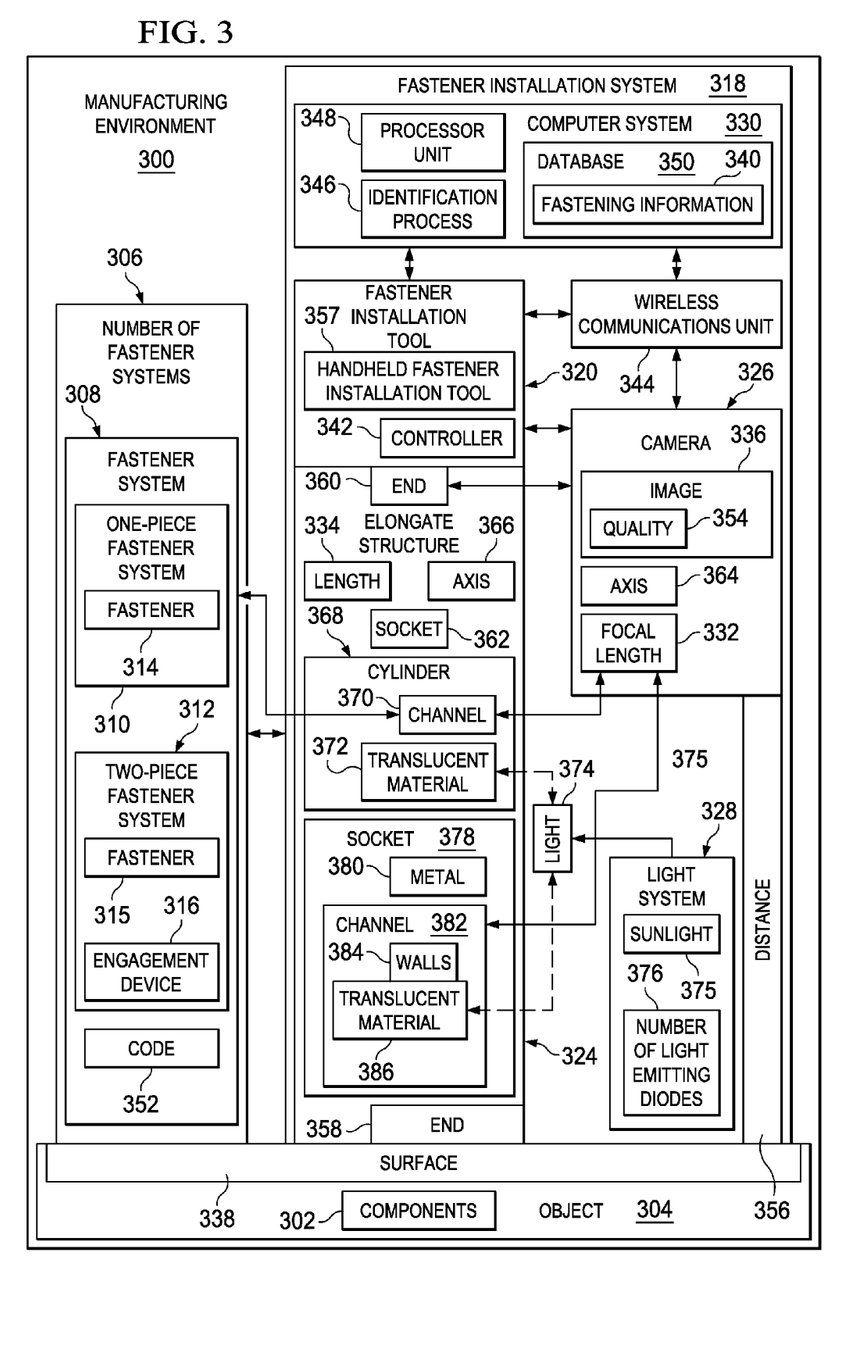
FIG. 3 is an illustration of a manufacturing environment in which fastener systems are installed in accordance with an advantageous embodiment.

With reference now to FIG. 3, an illustration of a manufacturing environment in which fastener systems are installed is depicted in accordance with an advantageous embodiment. As depicted, manufacturing environment 300 may be used to attach components 302 to each other in manufacturing object 304. Components 302 may form object 304. In these illustrative examples, object 304 may be, for example, without limitation, aircraft 200 in FIG. 2. In other illustrative examples, object 304 may be a part, a substructure, a subassembly, or some other part of aircraft 200.

In attaching components 302 to each other, number of fastener systems 306 may be installed to mechanically attach components 302 to each other. Number of fastener systems 306 may take various forms in the different advantageous embodiments. For example, without limitation, fastener system 308 in number of fastener systems 306 may be one-piece fastener system 310 or two-piece fastener system 312.

One-piece fastener system 310 may comprise fastener 314. Fastener 314 may be, for example, without limitation, a rivet, a screw, a bolt, a pin, and/or some other suitable type of fastener. In this illustrative example, two-piece fastener system 312 may include fastener 315 and engagement device 316. In this example, fastener 315 may be, for example, without limitation, a bolt, a lug bolt, a head bolt, a lag bolt, a pin, or some other suitable type of fastener. Fastener 315 may engage engagement device 316. Engagement device 316 may be, for example, without limitation, a nut, a collar, or some other suitable device.

In these illustrative examples, fastener installation system 318 may be used to install number of fastener systems 306 in components 302. In these illustrative examples, fastener installation system 318 may include fastener installation tool 320, elongate structure 324, camera 326, light system 328, and computer system 330. Elongate structure 324 may be configured for attachment to fastener installation tool 320. Elongate structure 324 may be removably attached to fastener installation tool 320 in these examples.

Camera 326 may be associated with fastener installation tool 320. Camera 326 may be configured with focal length 332, which may correspond to length 334 of elongate structure 324. Camera 326 may be configured to capture image 336 of at least a portion of fastener system 308 when elongate structure 324 is placed on object 304 on which fastener system 308 is located.

In these depicted examples, focal length 332 may correspond to length 334 of elongate structure 324 by being set based on length 334. In other advantageous embodiments, focal length 332 may be fixed and elongate structure 324 may be selected such that length 334 is based on focal length 332. In some advantageous embodiments, length 334 may not be substantially equal to focal length 332. For example, without limitation, length 334 of elongate structure 324 may be selected such that length 334 of elongate structure 324 attached to fastener installation tool 320 corresponds to focal length 332. As another example, when focal length 332 is fixed, camera 326 may be moved forwards or backwards along axis 364 through focal length 332 for elongate structure 324 selected with length 334 not substantially equal to focal length 332.

In these illustrative examples, fastener installation tool 320 may install number of fastener systems 306 in components 302 for object 304 using fastening information 340. Fastening information 340 may be, for example, without limitation, data, values, parameters, programs, and/or other suitable information used by fastener installation tool 320 to install number of fastener systems 306 into components 302 for object 304. In these examples, controller 342 may be located in fastener installation tool 320 and may use fastening information 340 to control the installation of number of fastener systems 306 in components 302 by fastener installation system 318.

Fastening information 340 for fastener system 308 may be identified using image 336 taken by camera 326. Image 336 may be sent from camera 326 and/or controller 342 to computer system 330 using wireless communications unit 344. Wireless communications unit 344 may be associated with fastener installation tool 320. For example, without limitation, wireless communications unit 344 may be located in camera 326, on fastener installation tool 320, or in some other suitable location.

Identification process 346 running on processor unit 348 in computer system 330 may process image 336. Identification process 346 may analyze image 336 using database 350. Database 350 may contain fastening information 340 for fastener system 308.

In analyzing image 336, identification process 346 may use object recognition to identify fastener system 308 and obtain fastening information 340 for fastener system 308. The identification of fastener system 308 may be performed based on at least one of the shape, size, and configuration of fastener system 308.

In some advantageous embodiments, fastener system 308 may include code 352, which is used to identify fastener system 308. For example, without limitation, code 352 may be a bar code or some other numerical code located on fastener system 308. For example, without limitation, if fastener system 308 takes the form of two-piece fastener system 312, code 352 may be located on at least one of fastener 314 and engagement device 316.

In these illustrative examples, quality 354 of image 336 may be affected by distance 356 between camera 326 and surface 338 of object 304. If distance 356 is not substantially the same as focal length 332, quality 354 may be insufficient to provide an identification of fastener system 308 to obtain fastening information 340. In these illustrative examples, fastener installation tool 320 may be handheld fastener installation tool 357.

In these illustrative examples, distance 356 may be consistently established as substantially the same as focal length 332 by using elongate structure 324 in positioning camera 326 relative to surface 338. In these depicted examples, elongate structure 324 may have first end 360 and second end 358. Second end 358 of elongate structure 324 may be placed against surface 338 with fastener system 308 in place. First end 360 of elongate structure 324 may be connected to fastener installation tool 320.

In this manner, distance 356 may be more consistently established as substantially the same as focal length 332 for camera 326 as compared to relying on a human operator to position fastener installation tool 320 without basing focal length 332 on length 334 of elongate structure 324. Further, with the use of elongate structure 324, movement, shaking, vibrations to camera 326, and/or other undesired changes in focal length 332 may be reduced or avoided.

In these illustrative examples, elongate structure 324 may have various forms and/or configurations. For example, without limitation, elongate structure 324 may be socket 362. Socket 362 may be configured to engage at least a portion of fastener system 308. As a specific example, when fastener system 308 takes the form of one-piece fastener system 310 and comprises fastener 314 in the form of a hexagonal bolt, socket 362 may be a hexagonal socket configured to engage the hexagonal bolt. Socket 362 may be rotated by fastener installation tool 320 to install fastener system 308.

In this illustrative example, camera 326 may be located beside first end 360 of elongate structure 324. Socket 362 may be placed onto surface 338 next to or near fastener system 308. The placement of second end 358 on surface 338 may be such that camera 326 may be capable of creating image 336 of fastener system 308. In other words, axis 364 through focal length 332 for camera 326 may be parallel to axis 366 through first end 360 and second end 358 for elongate structure 324.

In another advantageous embodiment, elongate structure 324 may be cylinder 368 with channel 370 extending from first end 360 to second end 358. In some advantageous embodiments, cylinder 368 may take the form of a socket. Cylinder 368 may be comprised of translucent material 372. Translucent material 372 may be configured to transmit and/or diffuse light 374 onto surface 338 where fastener system 308 may be located. Light 374 may be provided by light system 328. Light system 328 may include, for example, without limitation, sunlight 375, number of light emitting diodes 376, and/or some other suitable light source.

In these advantageous embodiments, light system 328 may be associated with fastener installation tool 320. As one example, light system 328 may be attached to fastener installation tool 320 external to elongate structure 324. As another example, light system 328 may be located within channel 370 of cylinder 368. In other advantageous embodiments, light system 328 may be located remote to fastener installation tool 320.

In this depicted example, light system 328 may be number of light emitting diodes 376. Of course, any type of light system may be employed that is configured to transmit light 374 onto surface 338 such as, for example, without limitation, a halogen lamp, an electroluminescent lamp, or some other suitable type of light system.

Sunlight 375 may be present within manufacturing environment 300. For example, without limitation, when attaching components 302 exterior to an aircraft, sunlight 375 may be used to provide light 374. Translucent material 372 may transmit and/or diffuse light 374 provided by sunlight 375 such that light system 328 is not needed. In other advantageous embodiments, translucent material 372 may be configured to transmit and/or diffuse light 374 provided by both light system 328 and sunlight 375.

In this depicted example, cylinder 368 may be placed on surface 338 such that fastener system 308 is inside channel 370 of cylinder 368. In this illustrative example, first end 360 of cylinder 368 may be attached to camera 326. In this manner, focal length 332 extends through channel 370 onto surface 338.

In yet other advantageous embodiments, elongate structure 324 may be socket 378. Socket 378 may be comprised of metal 380 and have channel 382. Walls 384 of channel 382 may be associated with translucent material 386. As with translucent material 372, translucent material 386 may be configured to transmit and/or diffuse light 374 onto surface 338 when second end 358 is placed against surface 338. In this particular example, camera 326 may be associated with fastener installation tool 320 such that when socket 378 is connected to fastener installation tool 320, focal length 332 of camera 326 may extend through channel 382.

In this manner, camera 326 may be consistently positioned such that distance 356 from camera 326 to surface 338 may be substantially the same as focal length 332. In this manner, camera 326 may consistently provide quality 354 for image 336. Further, with elongate structure 324, reductions in quality 354 caused by movement, vibrations, and/or shaking of fastener installation tool 320 when operated by a human operator, may be reduced and/or eliminated. This situation also may increase quality 354 of image 336.

The illustration of fastener installation system 318 in manufacturing environment 300 is not meant to imply physical or architectural limitations to the manner in which different features may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, without limitation, in some advantageous embodiments, elongate structure 324 may have a shape other than a cylinder. For example, without limitation, elongate structure 324 may have a cross section with a rectangular shape, a square shape, an oval shape, or some other suitable shape. Further, elongate structure 324 may not have a consistent diameter throughout the length of elongate structure 324. In these examples, elongate structure 324 is a rigid structure. In other words, elongate structure 324 may not compress or expand such that length 334 stays substantially the same. In yet other advantageous embodiments, fastener installation tool 320 may be operated by a robot or other computer-controlled machine. In yet other examples, additional fastener installation tools, in addition to fastener installation tool 320, may be present in fastener installation system 318.

Figure 4:
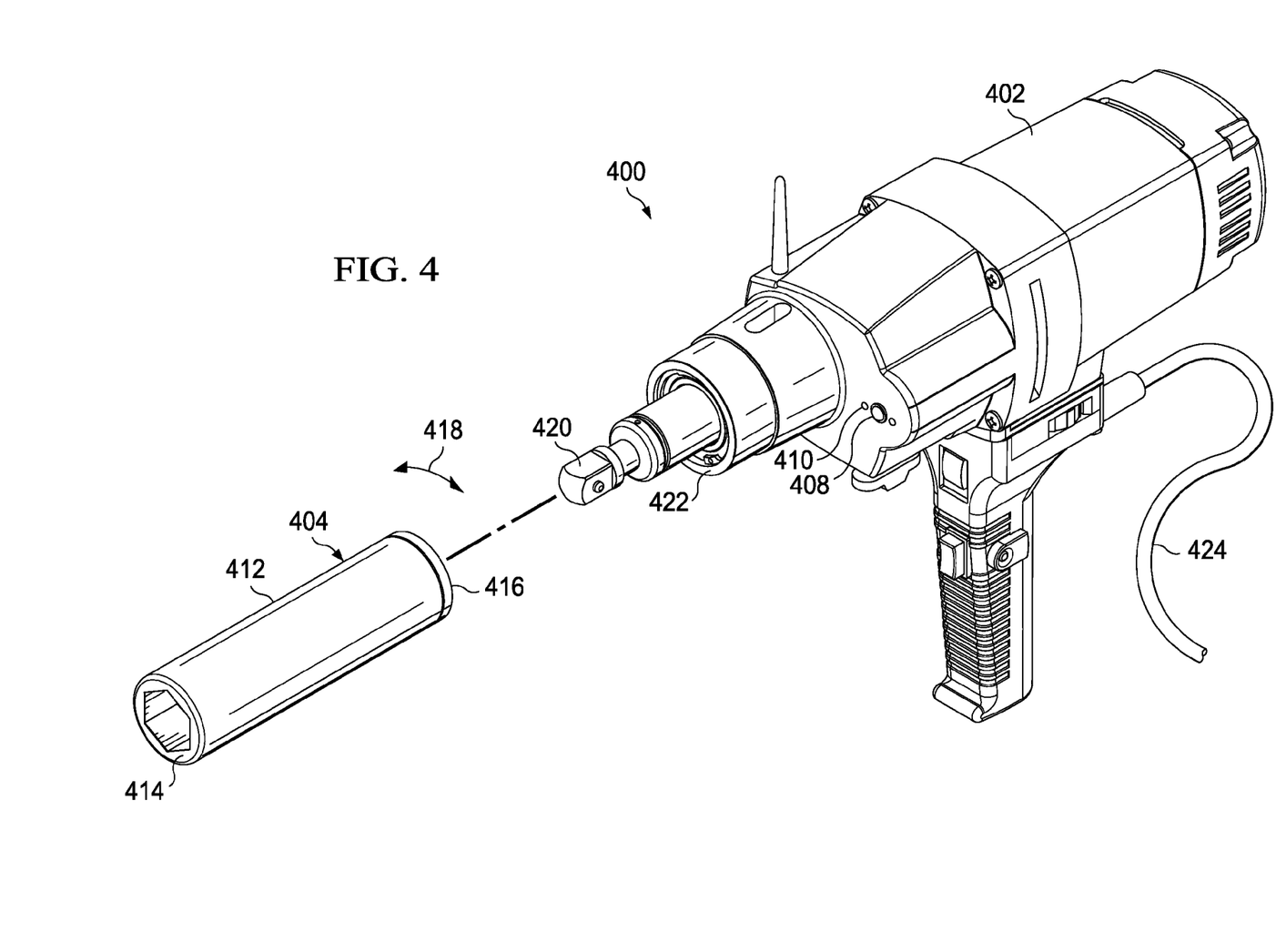
FIG. 4 is an illustration of a fastener installation system in accordance with an advantageous embodiment.

With reference now to FIG. 4, an illustration of a fastener installation system is depicted in accordance with an advantageous embodiment. In this illustrative example, fastener installation system 400 is an example of one implementation for fastener installation system 318 in FIG. 3.

In this example, fastener installation system 400 may include fastener installation tool 402, elongate structure 404, camera 408, and light system 410. In this illustrative example, elongate structure 404 may take the form of socket 412. In this example, socket 412 has end 414 and end 416. End 416 may be configured to engage fastener installation tool 402 and be rotated by fastener installation tool 402 in the direction of arrow 418. More specifically, end 416 of socket 412 may be configured to engage tool holder 420 on spindle 422. In other words, end 416 may be secured to tool holder 420.

In these illustrative examples, cord 424 may attach fastener installation tool 402 to a power source. This power source may be, for example, without limitation, an electric outlet or some other suitable power source. Cord 424 may be an electric cord in these examples. In other illustrative examples, cord 424 may be a pneumatic line or some other suitable type of connection to a power source. In some advantageous embodiments, fastener installation tool 402 may be battery-powered and may not have cord 424.

Figure 5:
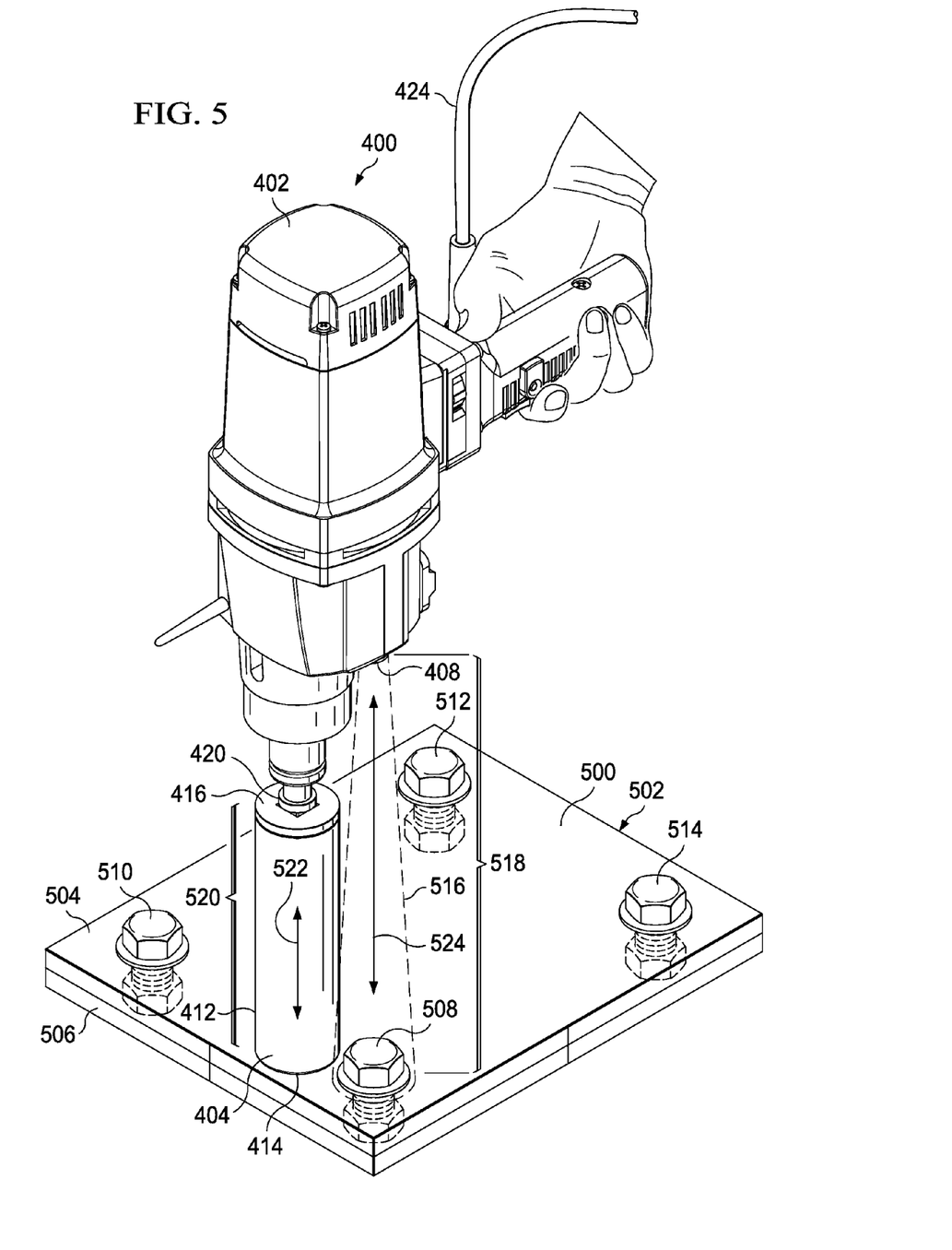
FIG. 5 is an illustration of acquiring an image using a fastener installation system in accordance with an advantageous embodiment.

Turning now to FIG. 5, an illustration of acquiring an image using a fastener installation system is depicted in accordance with an advantageous embodiment. In this example, fastener installation tool 402 of fastener installation system 400 is depicted with respect to surface 500 of object 502. In this example, object 502 may be comprised of component 504 and component 506. In this illustrative example, fasteners 508, 510, 512, and 514 may be used to attach components 504 and 506 to each other to form object 502.

In this illustrative example, end 414 of socket 412 may be placed onto surface 500 of object 502. The placement of end 414 may be such that camera 408 may be capable of acquiring an image of fastener 508.

In this example, focal length 516 may be established for camera 408 such that the image of fastener 508 may have a desired quality. Focal length 516 may be set based on length 520 of socket 412. In the illustrative examples, distance 518 may be between camera 408 and surface 500. Distance 518 may be substantially the same each time end 414 is placed onto surface 500. As a result, distance 518 may be substantially the same as focal length 516 for camera 408.

Further, in these examples, socket 412 may have axis 522 that extends through end 414 and end 416 of socket 412. Axis 522 may be substantially parallel to axis 524 through focal length 516 for camera 408. In these illustrative examples, axis 524 may be an axis through the center of socket 412. In other words, the image captured for fastener 508 by camera 408 may be centered about axis 524. In other advantageous embodiments, axis 524 through focal length 516 may be off-center from the center of socket 412.

Figure 6:
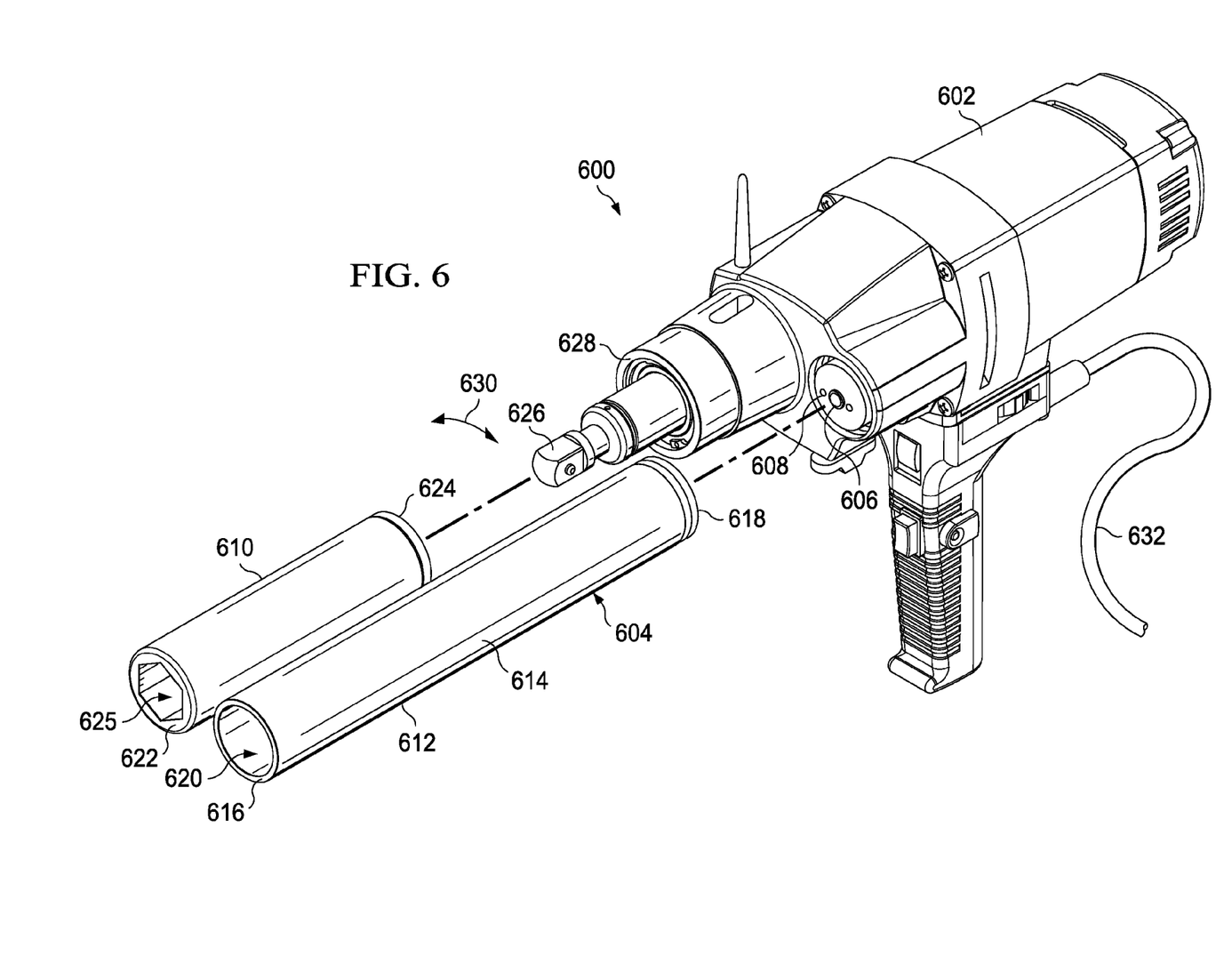
FIG. 6 is an illustration of a fastener installation system in accordance with an advantageous embodiment.

Turning now to FIG. 6, an illustration of a fastener installation system is depicted in accordance with an advantageous embodiment. In this illustrative example, fastener installation system 600 is an example of another implementation of fastener installation system 318 in FIG. 3.

As depicted, fastener installation system 600 may include fastener installation tool 602, elongate structure 604, camera 606, light system 608, and socket 610. In this illustrative example, elongate structure 604 may take the form of cylinder 612. Further, cylinder 612 may be comprised of translucent material 614. Cylinder 612 may have end 616 and end 618. End 618 may be attached to fastener installation tool 602. Cylinder 612 may be permanently and/or removably attached to fastener installation tool 602. Cylinder 612 also may have channel 620 extending from end 616 to end 618.

In this example, socket 610 may be a separate structure from elongate structure 604. Socket 610 may have end 622 and end 624. Socket 610 may have channel 625 extending from end 622 to end 624. End 624 may be removably attached to tool holder 626 on spindle 628. Fastener installation tool 602 may rotate socket 610 in the direction of arrow 630.

In this illustrative example, fastener installation tool 602 also may have cord 632. Cord 632 may connect fastener installation tool 602 to a power source, such as an electric outlet.

Figure 7:
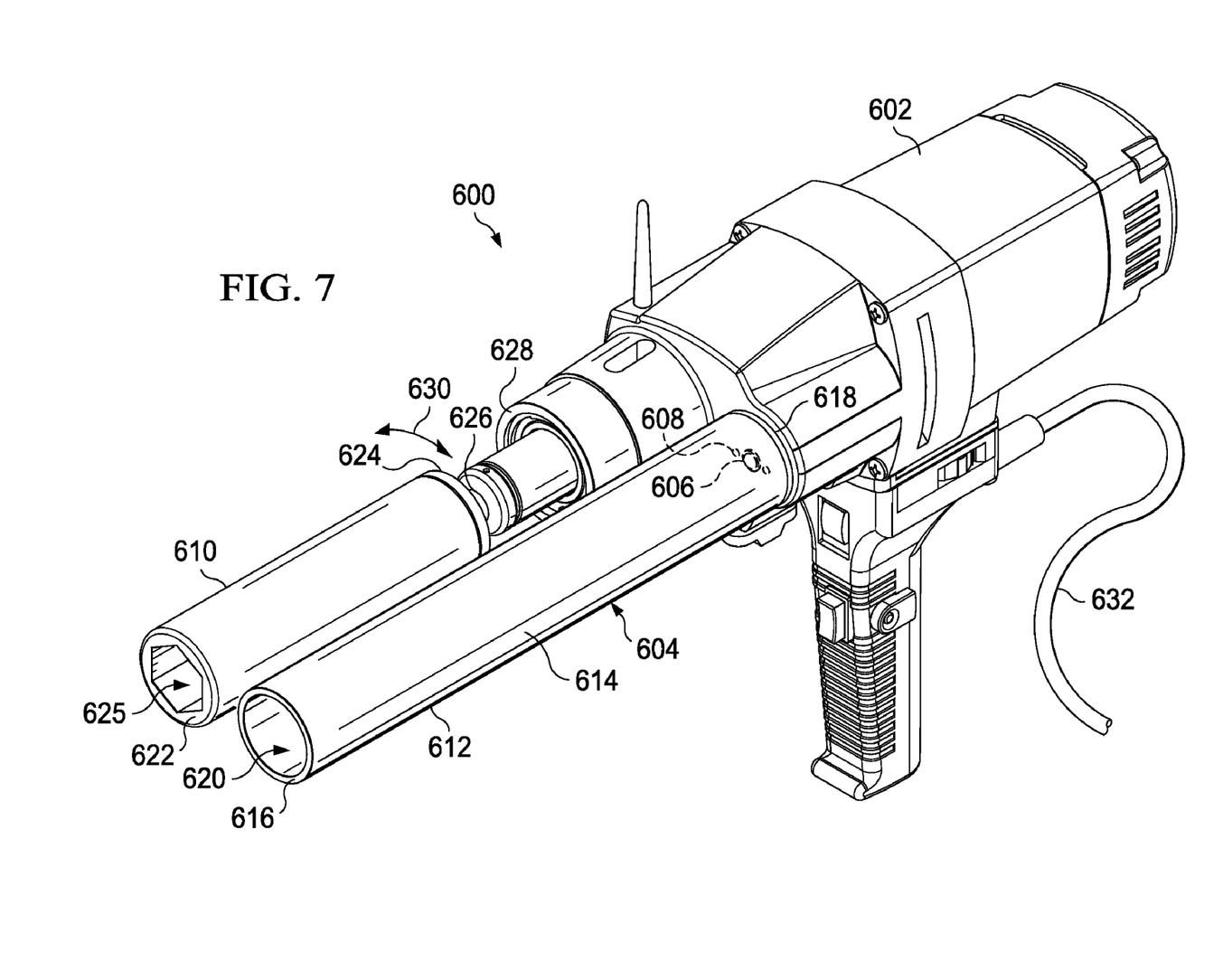
FIG. 7 is an illustration of a fastener installation system in accordance with an advantageous embodiment.

Turning now to FIG. 7, an illustration of a fastener installation system is depicted in accordance with an advantageous embodiment. In this example, fastener installation system 600 is shown in an assembled view.

Figure 8:
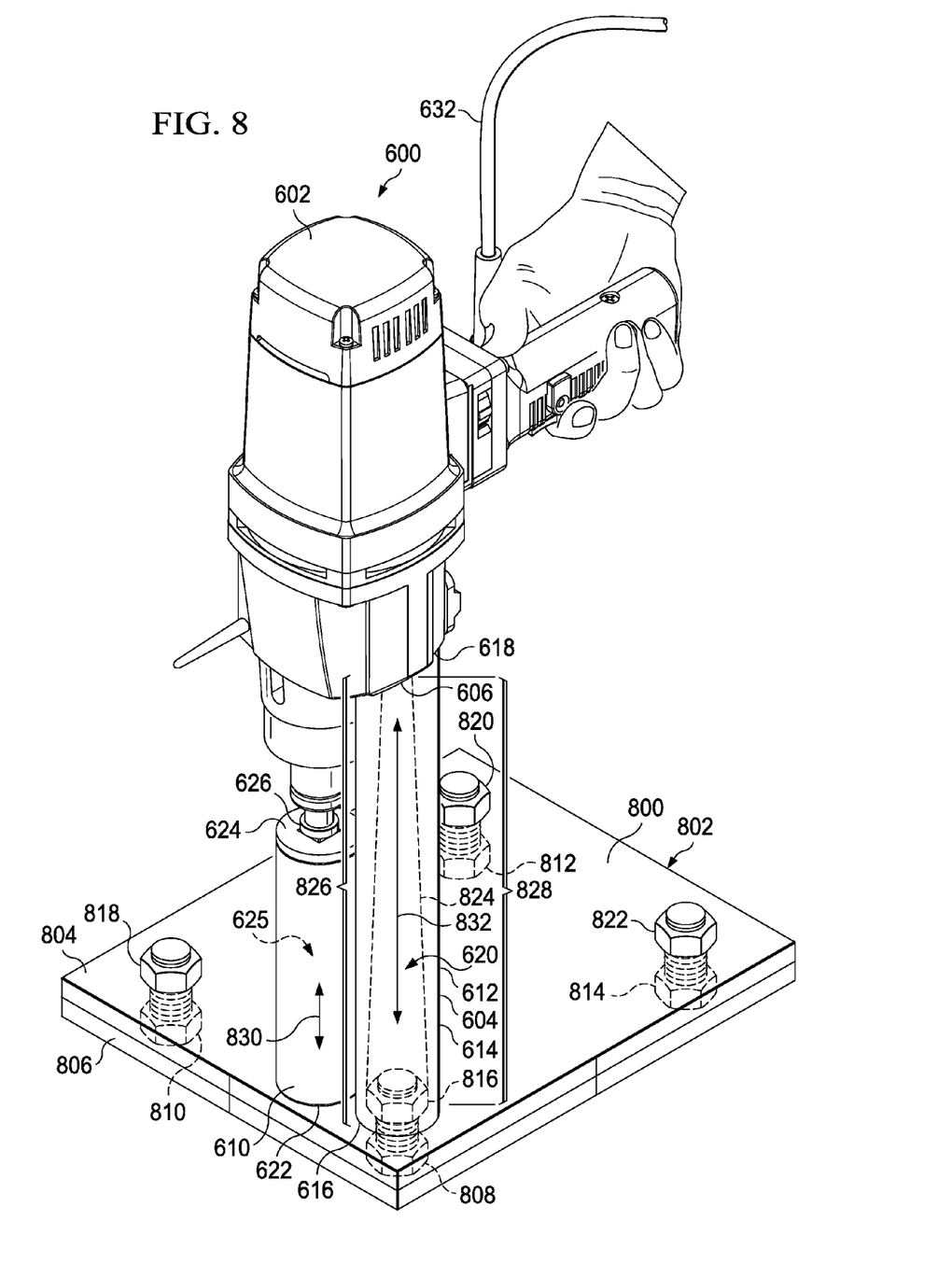
FIG. 8 is an illustration of acquiring an image using a fastener installation system in accordance with an advantageous embodiment.

Turning now to FIG. 8, an illustration of acquiring an image using a fastener installation system is depicted in accordance with an advantageous embodiment. In this illustrative example, fastener installation tool 602 may be placed onto surface 800 of object 802. Object 802 may be formed by component 804 and component 806. Fasteners 808, 810, 812, and 814, along with collars 816, 818, 820, and 822, may be installed to attach component 804 and component 806 to each other to form object 802.

In this example, end 616 of cylinder 612 may be placed onto surface 800 such that collar 816 and fastener 808 may be located within channel 620 of cylinder 612. In this manner, camera 606 may be capable of capturing an image of collar 816 and fastener 808. In this illustrative example, camera 606 may have focal length 824. Focal length 824 may correspond to length 826 of cylinder 612.

In this illustrative example, distance 828 may be substantially the same as focal length 824. In these examples, distance 828 may be between camera 606 and end 616 of channel 620. In this manner, distance 828 may be substantially the same as focal length 824 each time fastener installation tool 602 is placed onto surface 800 of object 802.

Further, in these examples, cylinder 612 may have axis 832 that extends through channel 620. Axis 832 may also extend through focal length 824. As depicted, axis 832 may be substantially parallel to axis 830, which may extend through channel 625 in socket 610.

Figure 9:
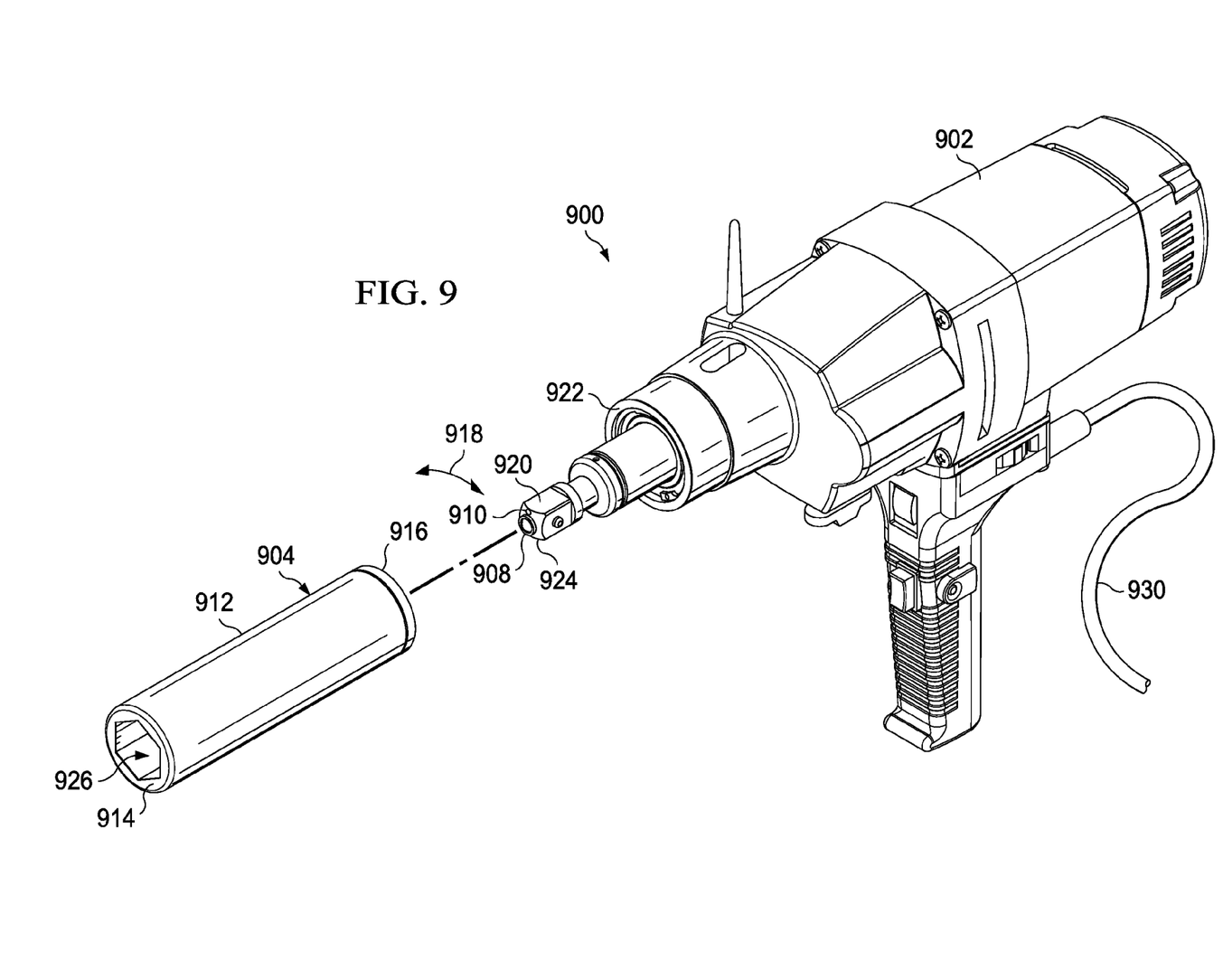
FIG. 9 is an illustration of a fastener installation system in accordance with an advantageous embodiment.

Turning now to FIG. 9, an illustration of a fastener installation system is depicted in accordance with an advantageous embodiment. Fastener installation system 900 may be an example of yet another implementation for fastener installation system 318 in FIG. 3.

In this depicted example, fastener installation system 900 may include fastener installation tool 902, elongate structure 904, camera 908, and light system 910. As shown, elongate structure 904 may be socket 912. Socket 912 may have end 914 and end 916. End 916 of socket 912 may be configured to be removably attached to tool holder 920 on spindle 922.

In this illustrative example, camera 908 and light system 910 may be located on end 924 of tool holder 920. Socket 912 may have channel 926 when end 916 of socket 912 is attached to tool holder 920. Camera 908 may be capable of capturing images of objects located in channel 926 at end 914.

In this depicted example, fastener installation tool 902 also may have cord 930. Cord 930 may connect fastener installation tool 902 to a power source, such as an electric outlet.

Figure 10:
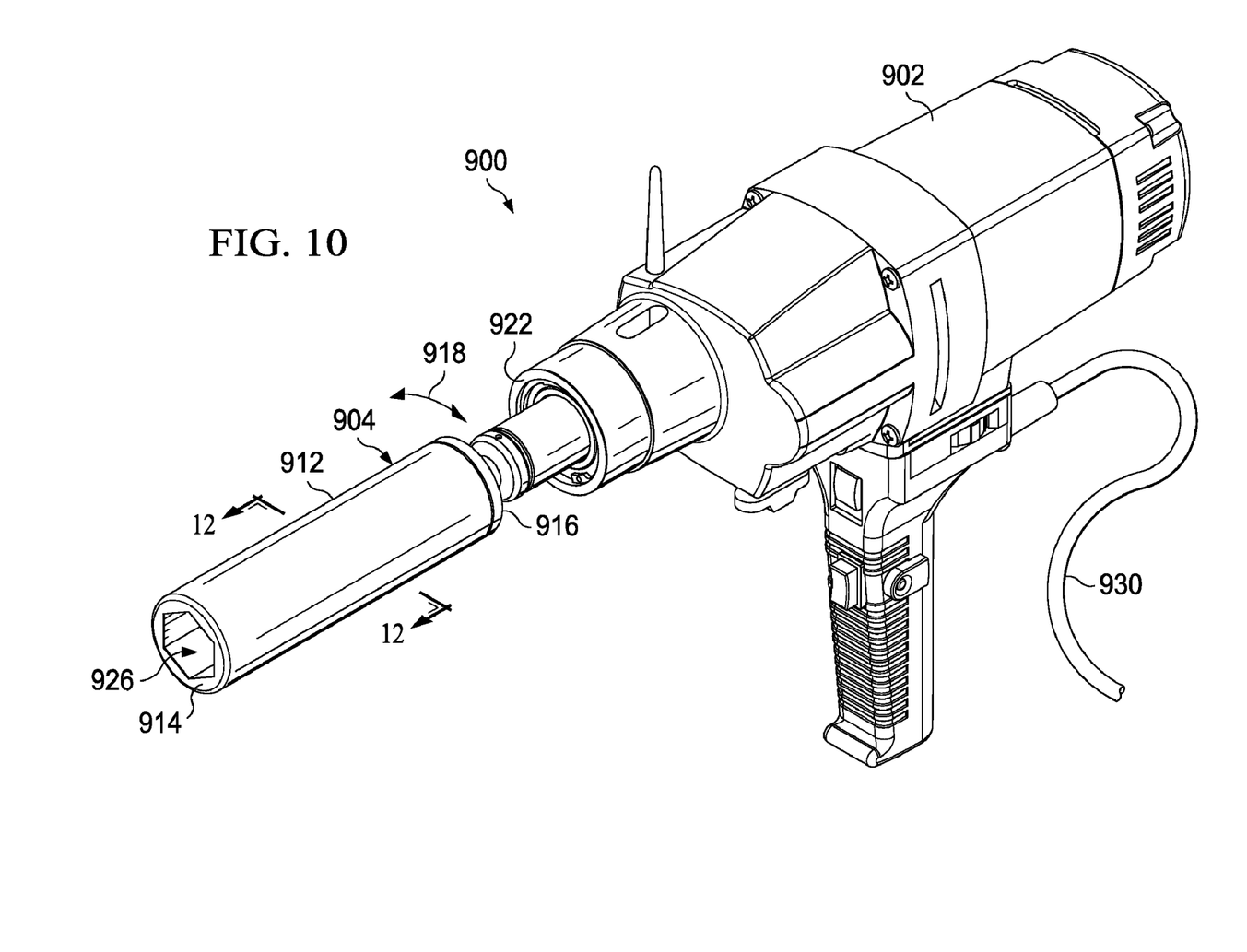
FIG. 10 is an illustration of an elongate structure attached to a fastener installation tool in accordance with an advantageous embodiment.

Turning now to FIG. 10, an illustration of an elongate structure attached to a fastener installation tool is depicted in accordance with an advantageous embodiment. In this example, socket 912 has been connected to fastener installation tool 902 and may be used to capture images of objects, as well as install fasteners.

Figure 11:
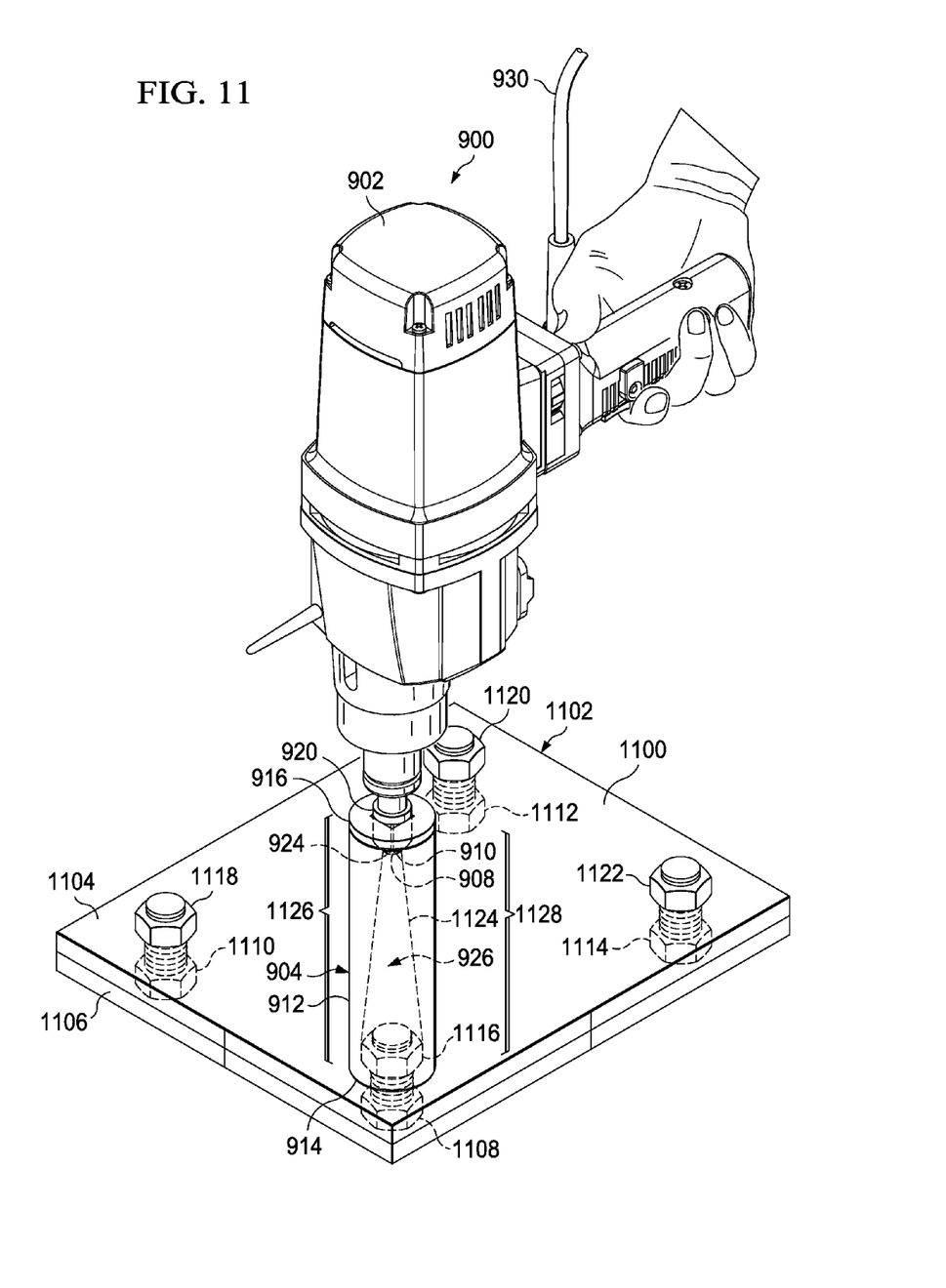
FIG. 11 is an illustration of acquiring an image using a fastener installation system in accordance with an advantageous embodiment.

Turning now to FIG. 11, an illustration of acquiring an image using a fastener installation system is depicted in accordance with an advantageous embodiment. In this illustrative example, fastener installation tool 902 has been placed onto surface 1100 of object 1102. Component 1104 and component 1106 may be attached to each other to form object 1102.

In these illustrative examples, fasteners 1108, 1110, 1112, and 1114 and collars 1116, 1118, 1120, and 1122 may be installed to secure component 1104 and component 1106 to each other.

In this illustrative example, end 914 of socket 912 may be placed onto surface 1100 of object 1102 such that fastener 1108 and collar 1116 may be located inside channel 926 of socket 912. In this example, camera 908 may have focal length 1124. Distance 1128 may be between camera 908 and surface 1100 when end 914 is placed against surface 1100 of object 1102. In this manner, distance 1128 may be substantially the same as focal length 1124 on a consistent basis. In these examples, focal length 1124 may extend through channel 926 in socket 912. Focal length 1124 may be set using length 1126 of socket 912.

Figure 12:
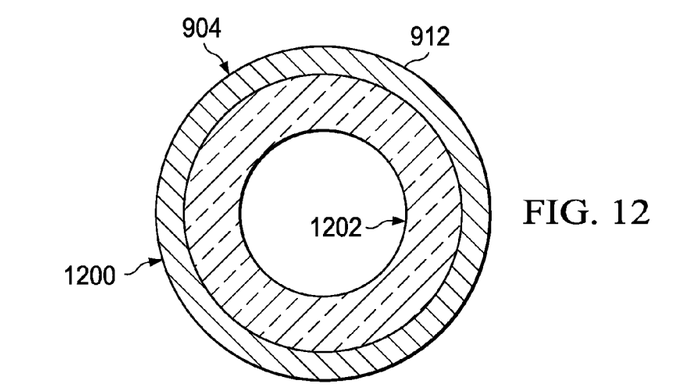
FIG. 12 is an illustration of a cross section of an elongate structure in accordance with an advantageous embodiment.

With reference now to FIG. 12, an illustration of a cross section of an elongate structure is depicted in accordance with an advantageous embodiment. In this illustrative example, the cross section of elongate structure 904 in the form of socket 912 may be seen taken along the lines 12-12 from FIG. 10. In this illustrative example, socket 912 may be comprised of metallic material 1200 and translucent material 1202. Translucent material 1202 may be configured to diffuse and/or transmit light.

The illustrations of fastener installation system 400, fastener installation system 600, and fastener installation system 900 in FIGS. 4-12 are not meant to imply physical or architectural limitations to the manner in which different advantageous embodiments may be implemented.

For example, without limitation, in some advantageous embodiments, translucent material 1202 may be unnecessary. Instead, only metallic material 1200 may be present. As another example, in the different illustrative examples, although not shown, a computer system, such as computer system 330 in FIG. 3, also may be part of fastener installation systems 400, 600, and 900.

In yet other advantageous embodiments, channels with ports may be present within metallic material 1200 to allow for the transmission of light from a light system to the fastener. In still other advantageous embodiments, if an appropriate material is found, a composite or translucent material may be used for socket 912 without requiring metallic material 1200. In still other advantageous embodiments, fastener installation tool 402, fastener installation tool 602, and fastener installation tool 902 may take the form of robotically-controlled fastener installation tools rather than handheld fastener installation tools.

Figure 13:
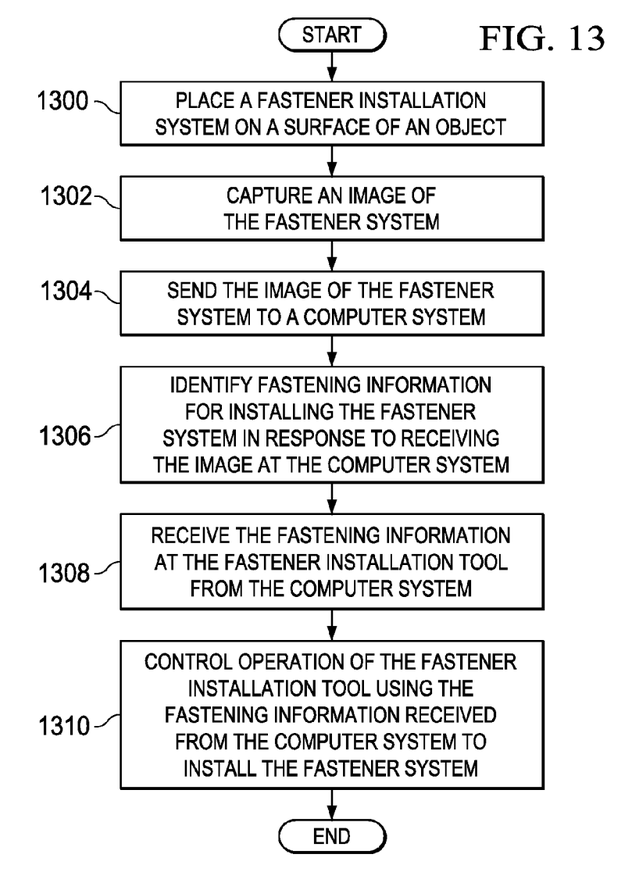
FIG. 13 is an illustration of a flowchart for installing a fastener system in accordance with an advantageous embodiment.

Turning now to FIG. 13, an illustration of a flowchart for installing a fastener system is depicted in accordance with an advantageous embodiment. The process illustrated in FIG. 13 may be implemented in manufacturing environment 300 in FIG. 3.

The process may begin by placing fastener installation system 318 on surface 338 of object 304 (operation 1300). Thereafter, the process may capture image 336 of fastener system 308 (operation 1302). Thereafter, image 336 of fastener system 308 may be sent to computer system 330 (operation 1304). In response to receiving image 336 at computer system 330, fastening information 340 for installing fastener system 308 may be identified (operation 1306). Fastening information 340 may be received at fastener installation tool 320 from computer system 330 (operation 1308). Operation of fastener installation tool 320 may be controlled using fastening information 340 received from computer system 330 to install fastener system 308 (operation 1310), with the process terminating thereafter.

The flowchart and block diagrams of the different depicted embodiments illustrate the architecture, functionality, and operation of some possible implementations of apparatus and methods in different advantageous embodiments. In this regard, each block in the flowchart or block diagrams may represent a module, segment, function, and/or a portion of an operation or step. In some alternative implementations, the function or functions noted in the blocks may occur out of the order noted in the figures. For example, without limitation, in some cases, two blocks shown in succession may be executed substantially concurrently, or the blocks may sometimes be executed in the reverse order, depending upon the functionality involved. Also, other blocks may be added in addition to the illustrated blocks in the flowchart or block diagram.

Thus, the different advantageous embodiments may provide a method and apparatus for installing a fastener system. One or more of the different advantageous embodiments may provide a capability to obtain images having a quality needed to identify fastener systems that may be installed. With the image, information used to install the fastener system may be identified and sent to the fastener installation tool for use in installing the fastener system.

In one or more advantageous embodiments, an apparatus may comprise a fastener installation tool, an elongate structure, and a camera. The elongate structure may be configured for attachment to the fastener installation tool and may have a length. The camera may be associated with the fastener installation tool and may be configured with a focal length that may correspond to the length of the elongate structure. The camera may be configured to capture an image of a fastener system when the elongate structure is placed against a surface of an object in which the fastener system is located.

The description of the different advantageous embodiments has been presented for purposes of illustration and description, and it is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a fastener installation tool;
   a camera affixed to the fastener installation tool, in which the camera is configured with a focal length corresponding to a length of an elongate structure removably attached to the fastener installation tool; and
   a light system connected to the fastener installation tool;
   wherein the elongate structure has a first end and a second end, and wherein the first end is attached to the fastener installation tool and the second end is configured for contact with a surface of an object, and
   wherein the elongate structure is selected from one of:
     a first socket configured to engage a fastener system of a workpiece, wherein the first socket is further configured to be attached to the fastener installation tool adjacent to the camera;
     a second socket having a first channel, in which the second socket is configured for attachment to the fastener installation tool through a tool holder, wherein the second socket comprises a metal, wherein a first translucent material is associated with walls of the first channel, and wherein the camera is affixed to the tool holder such that the camera is configured to capture a first image through the first channel; and
     a cylinder having a second channel through which the camera captures a second image, wherein the camera is affixed directly to the fastener installation tool, and wherein the cylinder comprises a second translucent material configured to transmit light from the light system to the fastener system.

2. The apparatus of claim 1 further comprising:
   a wireless communications unit in communication with the camera, wherein the wireless communications unit is configured to send the image of at least a portion of the fastener system to a computer system.

3. The apparatus of claim 2 further comprising:
   a controller, wherein the controller is configured to receive instructions from the computer system for use in installing the fastener system and is configured to run the instructions to install the fastener system.

4. The apparatus of claim 1, wherein the light system is selected from at least one of a number of light emitting diodes and sunlight.

5. The apparatus of claim 1, wherein the object is selected from one of a mobile platform, a stationary platform, a land-based structure, an aquatic-based structure, a space-based structure, an aircraft, a surface ship, a tank, a personnel carrier, a train, a spacecraft, a space station, a satellite, a submarine, an automobile, a power plant, a bridge, a dam, a manufacturing facility, a building, a wing, a stabilizer, a fuselage, and an engine.

6. A fastener installation system for installing fastener systems in an aircraft structure comprising:
   a fastener installation tool;
   a camera associated with the fastener installation tool, in which the camera is configured with a focal length corresponding to a length of an elongate structure;
   a light system, wherein the light system is selected from at least one of a number of light emitting diodes and sunlight;
   the elongate structure having the length and being configured for attachment to the fastener installation tool, in which the camera is configured to capture an image of at least a portion of a fastener system when the elongate structure, attached to the fastener installation tool, is placed against a surface of an object on which the fastener system is located, in which the elongate structure is selected from one of a first socket configured to engage the at least a portion of the fastener system and is configured to be attached to the fastener installation tool adjacent to the camera; a second socket having a first channel in which the second socket is configured for attachment to the fastener installation tool through a tool holder and the second socket is comprised of a metal in which a first translucent material is associated with walls of the first channel in which the camera is associated with the tool holder and captures a fist image through the first channel; and a cylinder having a second channel through which the camera captures a second image, in which the cylinder is comprised of a second translucent material configured to transmit light from the light system to the fastener system;
   a computer system configured to identify fastening information for installing the fastener system from the image of the at least a portion of the fastener system;
   a wireless communications unit in communication with the camera, in which the wireless communications unit is configured to send the image of the at least a portion of the fastener system to the computer system; and
   a controller, in which the controller is configured to receive the fastening information from the computer system for use in installing the fastener system and is configured to use the fastening information to install the fastener system.

7. A method for processing a fastener system, the method comprising:
   placing a fastener installation tool on a surface of an object wherein a length of an elongate structure is removably attached to the fastener installation tool, and wherein the elongate structure has a first end and a second end, and wherein the first end is attached to the fastener installation tool and the second end is configured for contact with the surface of the object, and
   wherein the elongate structure is selected from one of:
     a first socket configured to engage a fastener system of a workpiece, wherein the first socket is further configured to be attached to the fastener installation tool adjacent to a camera;
     a second socket having a first channel, in which the second socket is configured for attachment to the fastener installation tool through a tool holder, wherein the second socket comprises a metal, wherein a first translucent material is associated with walls of the first channel, and wherein the camera is affixed to the tool holder such that the camera is configured to capture a first image through the first channel; and
     a cylinder having a second channel through which the camera captures a second image, wherein the camera is affixed directly to the fastener installation tool, and wherein the cylinder comprises a second translucent material configured to transmit light from a light system to the fastener system; and capturing an image of at least a portion of the fastener system with the fastener installation tool on the surface of the object.

8. The method of claim 7 further comprising:
sending the image of the at least a portion of the fastener system to a computer system; and
receiving fastening information for installing the fastener system from the computer system in response to sending the image to the computer system.

9. The method of claim 8 further comprising:
controlling operation of the fastener installation tool using the fastening information received from the computer system to install the fastener system.

10. The method of claim 8 further comprising:
responsive to receiving the image at the computer system, identifying the fastener system using the image;
responsive to identifying the fastener system, identifying the fastening information for installing the fastener system; and
sending the fastening information identified for installing the fastener system from the computer system to the fastener installation tool in response to sending the image to the computer system.

11. A method for installing fastener systems in an aircraft structure, the method comprising:
placing a fastener installation tool on a surface of an object in which an elongate structure is configured for attachment to the fastener installation tool in which the elongate structure has a length, in which a camera is associated with the fastener installation tool in which the camera is configured with a focal length corresponding to the length of the elongate structure and is configured to capture an image of at least a portion of a fastener system when the elongate structure is placed against the surface of the object on which the fastener system is located; and in which a light system is associated with the fastener installation tool, the elongate structure being selected from one of a first socket configured to engage the fastener system and configured to be attached to the fastener installation tool adjacent to the camera; a second socket having a first channel in which the second socket is configured for attachment to the fastener installation tool through a tool holder and the second socket is comprised of a metal in which a first translucent material is associated with walls of the first channel in which the camera is associated with the tool holder and captures a first image through the first channel; and a cylinder having a second channel through which the camera captures a second image and in which the cylinder is comprised of a second translucent material configured to transmit light from the light system to the fastener system;

capturing the image of the at least a portion of the fastener system;
sending the image of the at least a portion of the fastener system to a computer system;
responsive to receiving the image at the computer system, identifying the fastener system using the image;
responsive to identifying the fastener system, identifying fastening information for installing the fastener system;
sending the fastening information identified for installing the fastener system from the computer system to the fastener installation tool in response to sending the image to the computer system; and
controlling operation of the fastener installation tool using the fastening information received from the computer system to install the fastener system.

* * * * *